United States Patent [19]

Suzuki

[11] Patent Number: 5,719,716
[45] Date of Patent: Feb. 17, 1998

[54] METHOD OF AND DEVICE FOR AUTOMATIC BIAS CONTROL

[75] Inventor: Shirou Suzuki, Tokorozawa, Japan

[73] Assignee: Pioneer Electronic Corporation, Tokyo-to, Japan

[21] Appl. No.: 568,321

[22] Filed: Dec. 6, 1995

[30] Foreign Application Priority Data

Dec. 7, 1994 [JP] Japan .................... 6-303526

[51] Int. Cl.$^6$ .................. G11B 5/02; G11B 5/03; G11B 5/035
[52] U.S. Cl. .................. 360/25; 360/65; 360/66; 360/31
[58] Field of Search .................. 360/65, 66, 31, 360/25

[56] References Cited

U.S. PATENT DOCUMENTS

| | | | |
|---|---|---|---|
| 4,220,979 | 9/1980 | Kitamura et al. ............... | 360/66 |
| 4,279,005 | 7/1981 | Kitamura et al. ............... | 360/65 X |
| 4,422,109 | 12/1983 | Sampei et al. ............... | 360/65 |
| 4,553,179 | 11/1985 | Nami et al. ............... | 360/66 |

*Primary Examiner*—Aristotelis M. Psitos
*Assistant Examiner*—Alan Faber
*Attorney, Agent, or Firm*—Young & Thompson

[57] ABSTRACT

A method of controlling a bias current required to record an audio signal on a recording medium includes the steps of: recording a test signal having a frequency component higher than a predetermined frequency on the recording medium and reproducing the recorded test signal from the recording medium; determining a reference amount of the bias current variation on the basis of the level of the reproduced test signal; determining a bias current variation characteristic of the recording medium on the basis of the reference amount; and varying the bias current in accordance with a level change of a high frequency component of the audio signal by referring to the bias current variation characteristic during a recording of the audio signal.

10 Claims, 12 Drawing Sheets

△: BIAS VARIATION AMOUNT AT 8kHz
×: BIAS VARIATION AMOUNT AT 10kHz
○: BIAS VARIATION AMOUNT AT 12kHz

FIG.12 f1: EDDY CURRENT OF RECORDING HEAD  
f2: DEMAGNETIZATION IN RECORDING  } LOSS IN RECORDING
f3: SELF-DEMAGNETIZATION  
f4: THICKNESS OF MAGNETIC LAYER  
f5: GAP OF RECORDING HEAD  
f6: SPACE OF RECORDING HEAD  } LOSS IN PLAYBACK
f7: ANGLE ERROR  
f8: EDDY CURRENT OF PLAYBACK HEAD

METHOD OF AND DEVICE FOR AUTOMATIC BIAS CONTROL

BACKGROUND OF THE INVENTION

1. Field of the Invention

This invention relates to a bias current control technique for controlling the bias current required to record an audio signal on a magnetic recording medium such as a magnetic tape, and more particularly to an automatic bias control technique for controlling the bias current to improve a frequency response at a high frequency range.

2. Description of the Prior Art

In recording an audio signal on a magnetic tape, it is possible that the high frequency component of the audio signal functions as the effective bias component. Namely, the high frequency component of the audio signal is practically added to the bias signal of the bias circuit, and the effective bias signal level becomes excessive. In order to eliminate the effect of the high frequency component of the audio signal, there has been proposed an automatic bias control device which detects the high frequency component of the recording signal (signal to be supplied by the magnetic head to the magnetic tape), identifies the bias current amount which may function as the effective bias component and subtracts the bias current amount thus identified from the original bias current produced by the bias circuit, thereby producing an appropriate effective bias current. The detail of this device is described in the Japanese patent application published under No. 62-50881. The above described automatic bias control device maintains the effective bias current to be constant. Therefore, the magnetic head is always applied with the constant effective bias current, and the level of the recording signal is stabilized regardless of the frequency of the audio signal to be recorded.

However, the above described automatic bias control device can merely eliminate the effect of the high frequency component of the audio signal, and cannot correct the degradation of the frequency response at the high frequency range which occurs in many magnetic tapes. This will be described in more detail. Generally, the magnetic tape has the following dispositions in connection with the bias and the recording signal.

(a) As the recording signal level increases, the recording sensitivity inclines to degrade at the high frequency range. Therefore, as the recording signal level increases, the border frequency at which the recording sensitivity degradation begins is gradually lowered.

(b) Up to a predetermined bias current amount, as the bias current amount decreases, the recordable level at the high frequency range increases.

(c) Up to a predetermined bias current amount, as the bias current amount increases, the recording sensitivity at high frequency range degrades.

Figure 1A:
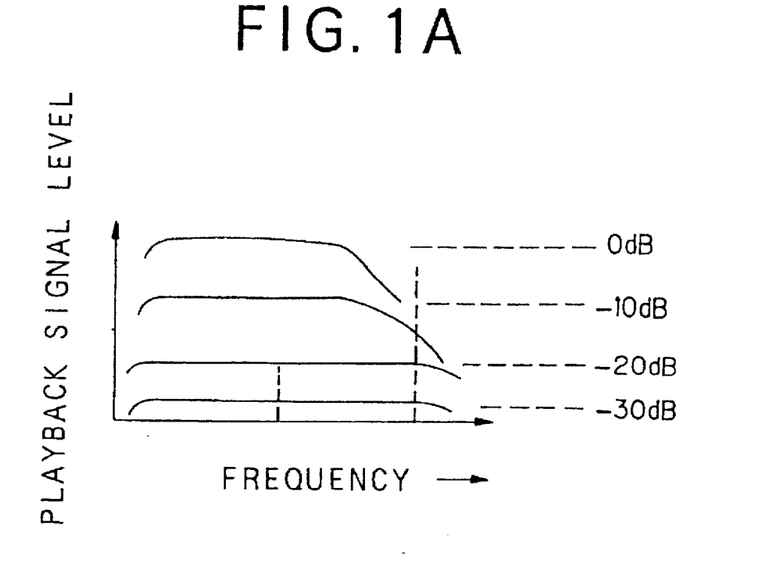
FIG. 1A is a diagram illustrating frequency responses for recording signals of different levels.
Figure 1B:
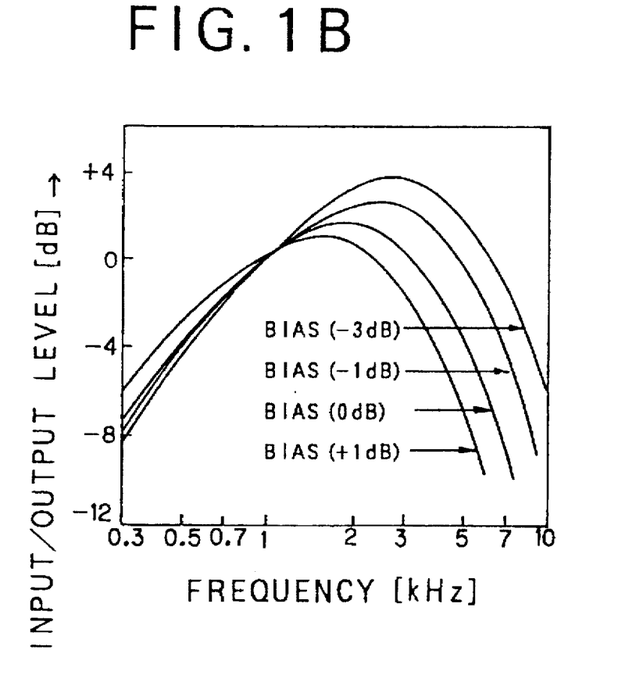
FIG. 1B is a diagram illustrating the effect of the bias current amount on the frequency response.

FIG. 1A illustrates frequency responses for recording signals of different levels. Specifically, FIG. 1A shows the recording/playback frequency responses obtained under such a condition that the bias current amount is fixed and normal equalization is applied, so as to produce flat frequency responses. As seen from FIG. 1A, as the recording signal level increases, the frequency at which the drop of the playback signal level begins becomes lower. This is due to the disposition (a). FIG. 1B illustrates the effect of the bias current amount on the frequency response. FIG. 1B exemplifies the dispositions (b) and (c). As seen from FIG. 1B, at the frequency range more than 1 kHz, the input/output level at the same frequency increases as the bias current decreases (due to the disposition (b)), and the input/output level at the same frequency decreases as the bias current increases (due to the disposition (c)).

The above-mentioned automatic bias control device can improve the dispositions (b) and (c) to some extent but cannot improve the disposition (a), because the disposition (a) differs between different types of magnetic tapes.

SUMMARY OF THE INVENTION

It is an object of the present invention to provide a method of and a device for automatic bias control which are capable of obtaining a flat frequency response at the high frequency range, regardless of the level of the recording signal.

According to one aspect of the present invention, there is provided a method of controlling a bias current required to record an audio signal on a recording medium, the method including the steps of: recording a test signal having a frequency component higher than a predetermined frequency on the recording medium and reproducing the recorded test signal from the recording medium; determining a reference amount of the bias current variation on the basis of the level of the reproduced test signal; determining a bias current variation characteristic of the recording medium on the basis of the reference amount; and varying the bias current in accordance with a level change of a high frequency component of the audio signal by referring to the bias current variation characteristic during a recording of the audio signal.

In accordance with the method, the test signal is recorded on and reproduced from the recording medium, and the reference amount of the bias variation is determined based on the reproduced test signal. Then, the bias current variation characteristic is determined based on the reference amount, and the audio signal is recorded on the recording medium with the bias current thus varied.

According to another aspect of the present invention, there is provided an automatic bias control device including: unit for generating a bias current; unit for recording a test signal having a predetermined level and a frequency component higher than a predetermined frequency; unit for recording the test signal on a recording medium and reproducing the recorded test signal from the recording medium; unit for determining a bias current variation characteristic of the recording medium on the basis of the reproduced test signal; unit for varying the bias current in accordance with a level change of a high frequency component of an audio signal by referring to the bias current variation characteristic; and unit for recording the audio signal on the recording medium using the bias current varied by said bias current varying unit.

In accordance with the device thus configured, the bias current generating unit generates a bias current, and the test recording unit records the test signal on the recording medium and then reproduces the recorded test signal therefrom. Then, the determination unit determines the bias current variation characteristic based on the reproduced test signal, and the bias current varying unit varies the bias current in accordance with the level change of a high frequency component of an audio signal and the bias current variation characteristic. At the time of recording, the recording unit records the audio signal using the bias current varied by the varying unit.

The nature, utility, and further features of this invention will be more clearly apparent from the following detailed description with respect to preferred embodiment of the

DESCRIPTION OF THE PREFERRED EMBODIMENT

A preferred embodiment of the present invention will be described below with reference to the accompanying drawings.

[1] Principle of the Invention

Prior to the description of the preferred embodiment, the principle of the invention will be described. The principle of the automatic bias control according to the invention will be described with reference to FIGS. 5A, 5B and 6.

(1) Analysis of the input/output characteristic of the magnetic tape:

By recording the audio signal on the magnetic tape which has the dispositions (a) to (c) described above under the condition that the bias current is constant, and by detecting the magnitude level of the playback signal from the magnetic tape, the following dispositions can be additionally found.

(d) As the frequency becomes high, the recording sensitivity degrades at the frequency range higher than a certain frequency.

(e) The higher the recording audio signal level is, the lower the frequency at which the degradation of the recording sensitivity starts becomes. This is because, as the recording audio signal level increases, the recording sensitivity at the high frequency range inclines to drop.

Figure 5A:
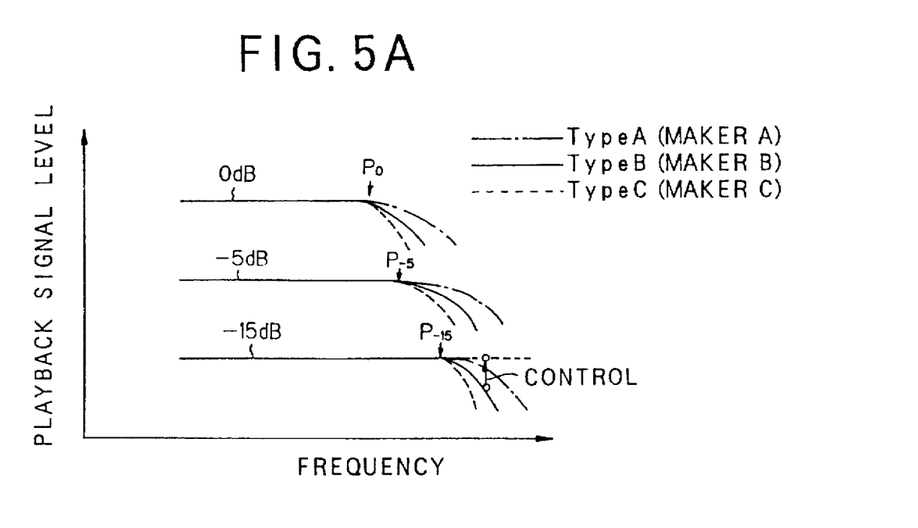
FIG. 5A is a diagram illustrating the frequency characteristic of the playback signal where the equalization is applied to produce the flat frequency response at the middle and low frequency range against a low level audio signal.
Figure 6:
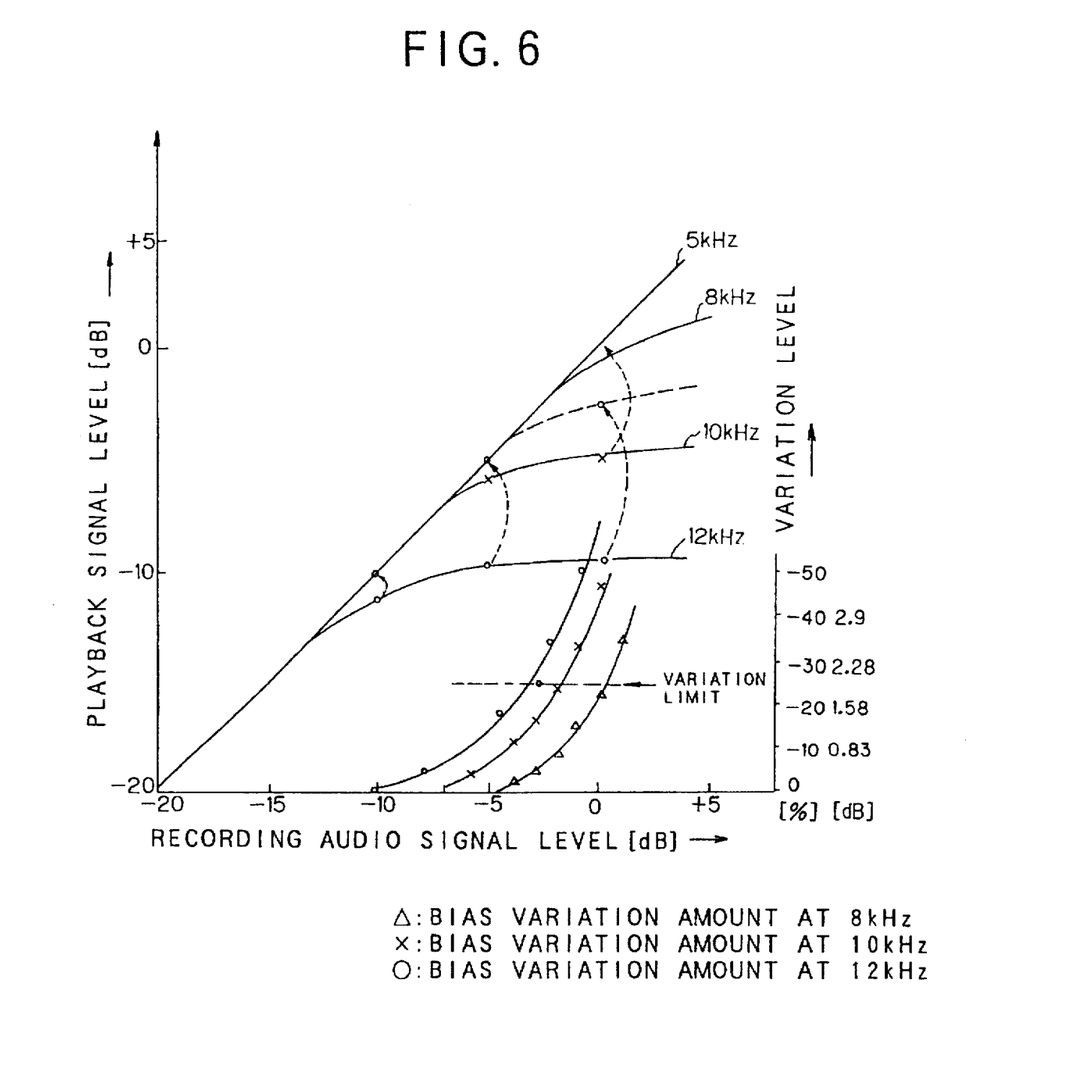
FIG. 6 is a diagram illustrating the variation of the playback signal level where the recording audio signal levels are varied for each frequencies.

The above dispositions (d) and (e) will be described with reference to FIGS. 5A and 6. FIG. 5A illustrates the frequency characteristic of the playback signal where the equalization is applied to produce the flat frequency response at the middle and low frequency range against a low level audio signal (e.g., −20 dB). FIG. 6 illustrates the variation of the playback signal level where the recording audio signal levels are varied for each frequency. As seen from FIG. 6, it is ideal that the variation of the playback signal level is proportional to the variation of the recording signal level (like the characteristic of the 5 kHz line in FIG. 6). However, as the frequency of the recording signal increases, the recording sensitivity on the magnetic tape degrades at the high frequency range, and hence the playback signal level drops. For this reason, the frequency characteristic of the playback signal actually obtained drops sharply at the high frequency range.

Figure 12:
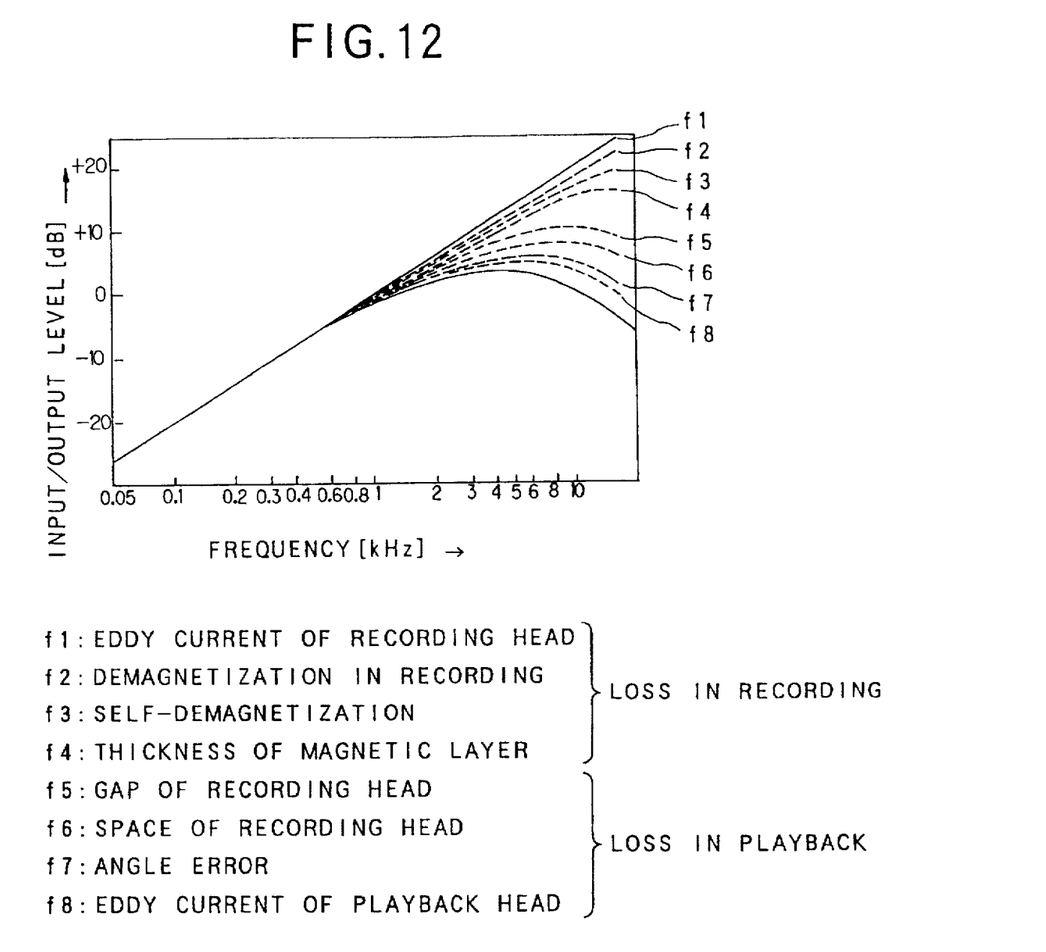
FIG. 12 is a diagram illustrating a general frequency characteristic of a playback signal.

FIG. 5A shows frequency characteristics of magnetic tapes of the same tape types (e.g., "normal type" or "chrome type") but manufactured by different makers A to C. The tape type is determined based on the difference of the magnetic material and the layer composition. The difference of the magnetic material and the layer composition result in a difference in the magnetic characteristics (e.g., residual magnetic flux density, coercive force, rectangle ratio, etc.) of the magnetic tapes. As seen from FIG. 5A, the magnetic characteristics are nearly identical between the tapes of identical tape types, and therefore the frequency (hereinafter referred to as "turning point frequency") at which the playback signal level begins to drop, responsive to the same recording signal level, is nearly identical. Actually, FIG. 5A, the turning points of the characteristics are identical between the magnetic tapes of different makers, for example, $P_0$ for the characteristics of 0 [dB] input, $P_{-5}$ for the characteristics of −5 [dB] input and $P_{-15}$ for the characteristics of −15 [dB] input. This is because, as shown in FIG. 12, the variation of the frequency characteristics at the high frequency range results from the loss factor in recording, such as the eddy current of the recording head, the demagnetization or the thickness of the magnetic layer, and the loss factor in the playback, such as the gap or the space of the reproduction head or the eddy current of the reproduction head. It is found that the cause of the above loss has a given logarithmic relationship corresponding to the reciprocal of the recording signal wavelength. Therefore, it is understood that the turning point of the characteristic varies depending upon the factors other than the magnetic material of the magnetic tape, that is, the factors common to the magnetic tapes of all makers. Namely, the difference of the recording signal levels gives greater effect on the turning point than the difference of the tape makers.

(2) Relationship between the bias current and the playback signal level:

In this invention, the bias current is varied so as to compensate for the degradation of the recording sensitivity at the high frequency range. In varying the bias current, the present invention utilizes such a disposition of the magnetic tape that the lower the bias current becomes, the higher the recording sensitivity becomes. Namely, according to the increase of the recording audio signal level, the bias current is varied (lowered) so that the input/output characteristic approaches to the ideal input/output characteristic (e.g., 5 [kHz] in FIG. 6) as closely as possible. For example, as to the characteristic of 12 [kHz] in FIG. 6, the control of the bias current is required so that the points (o) on the characteristic of 12 [kHz] move to the points (o) on the characteristic of 5 [kHz]. Similarly, as to the characteristic of 10 [kHz] in FIG. 6, the control of the bias current is required so that the points (x) on the characteristic of 10 [kHz] move to the points (x) on the characteristic of 5 [kHz]. This invention utilizes, as the reference point, the turning points of the characteristics which are approximately the same value for the magnetic tapes of every maker. Thus, the bias control is carried out at the frequency range higher than the turning point. The turning points slightly differ from each other between different tape types. Therefore, accurate bias control can be performed by detecting the tape type because the magnetic tapes of the same tape type indicate identical characteristics irrespective of the maker thereof. In this view, in order to accurately perform the bias control, it is preferred that the tape type is discriminated and the bias is varied in accordance with the tape type.

Figure 5B:
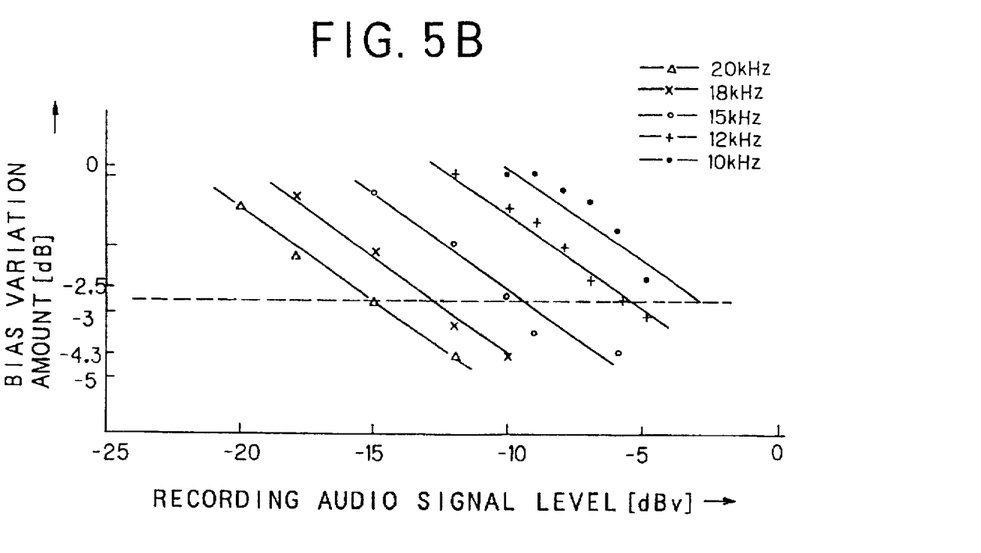
FIG. 5B is a diagram illustrating the bias variation amount required to compensate for the drop of the recording sensitivity at the high frequency range.

FIG. 5B illustrates the bias variation amount required to compensate for the drop of the recording sensitivity at the high frequency range where the linearity of the characteristic is not ensured. As seen from FIG. 5B, the necessary variation amounts of the bias current, against the variation of the recording audio signal level, change nearly according to the same characteristic, regardless of the frequencies thereof. This means that the unique bias variation amount can be used, in common, for the compensation of two different conditions in which the frequencies and the recording signal levels are different. The broken line in FIG. 5B indicates the bias variation amount by which an ideal playback signal level can be obtained. For example, the variation amount required at the condition: 15 [kHz]/−10 [dB], is approximately the same as the variation amount required at the condition: 12 [kHz]/−5.5 [dB]. In view of the above analyses, the following dispositions can be obtained.

(f) The turning point of the characteristic where the playback level begins to drop largely depends upon the recording audio signal level, but hardly depends upon the difference of the tape makers.

(g) An appropriate bias variation amount has an approximately linear relationship with the recording audio signal level.

(h) The relationships between the recording audio signal level and the variation amount with respect to the different frequencies can be obtained by the measurements (see. FIG. 5B).

(3) Principle for varying the bias current:

In view of the above dispositions (f) to (h), the bias current is varied to compensate for the drop of the recording sensitivity. Namely, a variation amount determining means converts the necessary bias current variation amount, which is determined according to the relationship between the variation of the recording audio signal level and the frequency of the recording audio signal, into a parameter (hereinafter referred to as "adjustment amount"), and the bias current is varied in consideration of the tape type differences. When the adjustment amount is expressed by $V_H$, the variation amount $i_B$ is obtained as follows:

$$i_B = -K \cdot V_H \quad (1),$$

where K is a coefficient determined depending upon the tape type.

Prior to the actual recording of the audio signal, a test audio signal of a predetermined frequency and a predetermined magnitude level is recorded on the objective magnetic tape while varying the bias current amount gradually. Then, the adjustment amount $V_H$ is detected (the adjustment amount $V_H$ corresponding to the test signal is expressed as $V_{HCP}$). In addition, the bias current amount $i_{BCP}$ by which the ratio of the playback signal level to the recording audio signal level for the magnetic tape becomes equal to the ratio of the playback signal level to the recording audio signal level at the lower frequency range where the frequency characteristic has no degradation (lower frequency than the turning point frequency). Then, from the adjustment amount $V_H$ and the bias current amount $i_{BCP}$, the coefficient K can be calculated. It is noted that the adjustment amount $V_H$ corresponding to the recording signal which needs the bias current variation will be hereinafter referred to as $V_{HT}$. The coefficient $K_T$ of the magnetic tape which is currently used in the recording and reproduction can be calculated as:

$$K_T = i_{BCP}/(V_{HCP} - V_{HT}) \quad (2).$$

By calculating the coefficient $K_T$ and substituting it to the equation (1) as the coefficient K, variation amount $i_B$ may be obtained. In this way, the bias current can be readily compensated for, in theory, based on the above described characteristic having the proportional relationship. If the variation of the adjustment amount $V_T$ is not in a proportional relationship with the variation amount of the bias current actually required, the adjustment amount may be obtained by looking up a table prepared in advance according to the calculations by a microcomputer or the like. Namely, by referring to the table and determining the variation amounts according to the contents of the table, variation amounts corresponding to various characteristics may be obtained.

Figure 2:
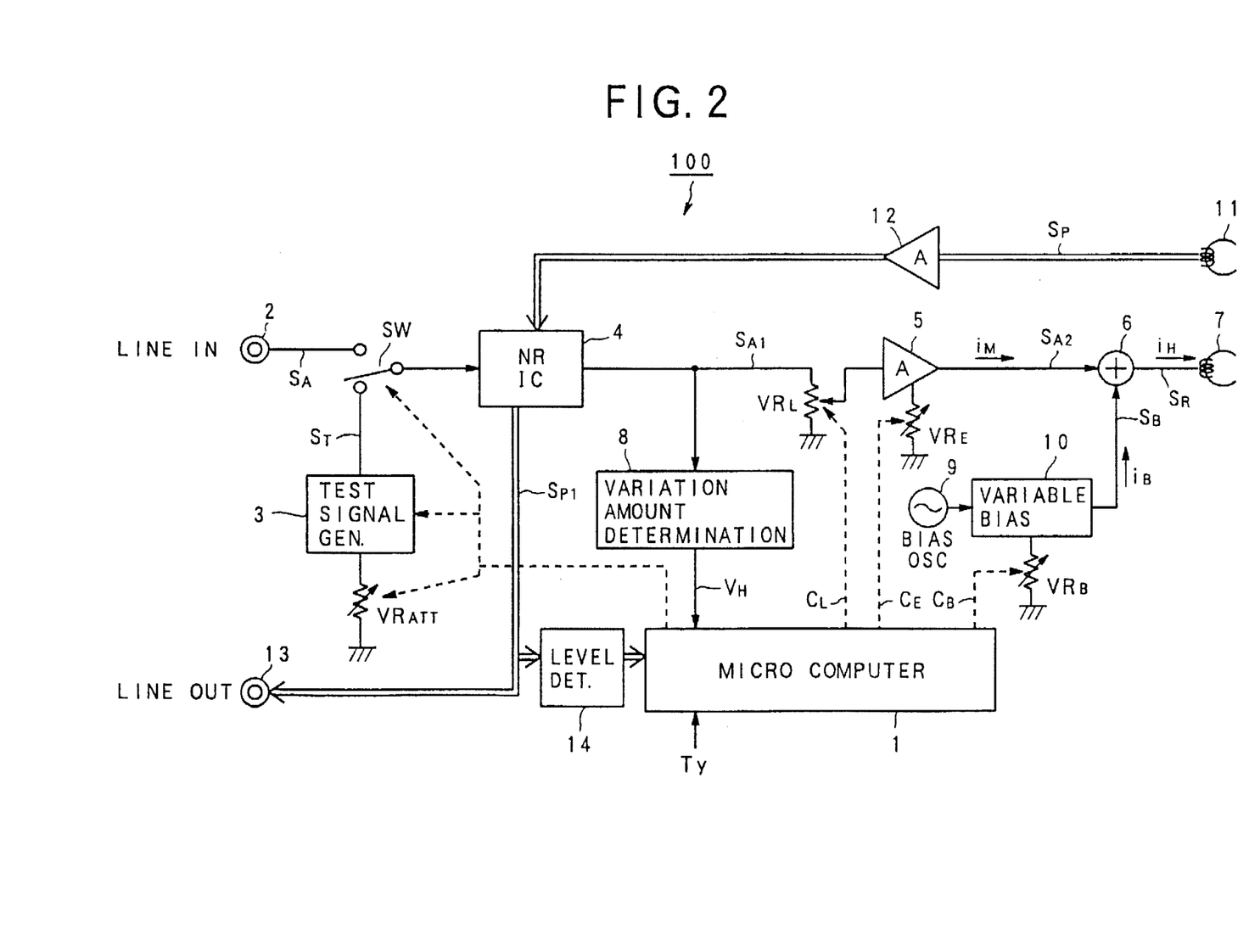
FIG. 2 is a block diagram illustrating the configuration of the automatic bias control device according to the embodiment of the invention.

[2] Configuration (1) Automatic bias control device:

FIG. 2 illustrates the configuration of the automatic bias control device according to the embodiment of the invention. In FIG. 2, the microcomputer 1 controls the performance of the automatic bias control device as a whole. The microcomputer 1 receives the playback signal $S_{P1}$ which is outputted by the noise reduction IC 4 and is digitized by the level detection circuit 14. Then, the microcomputer 1 controls the variable resistor $VR_E$ of the recording equalizer amplifier 5 by the control signal $C_E$. In addition, the microcomputer 1 outputs the control signal $C_L$ to adjust the variable resistor $VR_L$ for recording level control, and outputs the control signal $C_B$, based on the adjustment amount signal $V_H$, so as to vary the bias current amount of the variable bias circuit 10. Further, the microcomputer 1 receives the tape type signal $T_y$ which identifies the magnetic characteristics of the magnetic tapes, and varies the reference bias current amount. Still further, the microcomputer 1 determines the bias current variation characteristics, based on the tape type signal $T_y$ and the adjustment amount signal $V_H$, to control the bias current amount in the bias current variation characteristics determination step. The detail of the bias current variation characteristic will be described later.

The test signal generator 3 generates the test signal $S_T$ having component of the first frequency (e.g., 400 [Hz]/−20 [dB] for 2-heads device) and the second frequency (e.g., 10 [kHz]/−20 [dB] and 12 [kHz]/−5 [dB] for 2-heads device). The magnitude level of the test signal $S_T$ is adjusted by the variable resistor $VR_{ATT}$. The terminal 2 receives the audio signal $S_A$, and the switch SW selects one of the audio signal $S_A$ and the test signal $S_T$. The noise reduction IC 4 amplifies the high frequency component of the audio signal $S_A$ using a given equalization characteristic at the time of recording, and attenuates the high frequency component of the playback signal $S_P$, at the time of playback, using the characteristic reverse to that used for the recording. Thereby, the noise reduction IC 4 outputs the playback signal $S_{P2}$ from which noise component such as hiss noise is eliminated to the terminal 13 and the microcomputer 1. The variable resistor $VR_L$ adjusts the recording level of the audio signal $S_{A1}$, the high frequency component of which is emphasized by the noise reduction IC 4. The recording equalizer amplifier 5 performs equalization in conformity with the recording/playback characteristic of the magnetic tape using the equalizing amount decided by the variable resistor $VR_E$. The adder 6 adds the bias signal $S_B$ adjusted by the variable bias circuit 10 to the audio signal $S_{A2}$ after equalization to produce the recording signal $S_R$, and the magnetic head 7 records the recording signal $S_R$ on the magnetic tape.

On the other hand, the variation amount determination circuit 8 receives the audio signal $S_{A1}$ from the noise reduction IC 4, and outputs the adjusting amount $V_H$ so that the playback signal takes a level high enough, as the frequency increases, at the high frequency range in which bias current variation is needed. This will be described in more detail later. The bias signal generator 9 outputs the bias signal of a predetermined frequency (e.g., 105 [kHz]). The variable bias circuit 10 amplifies the bias signal $S_B$ by the current amount specified by the variable resistor $VR_B$, and supplies it to the adder 6. The variable bias circuit 10 may be configured by a voltage controlled amplifier (VCA) circuit or the like. The playback head 11 receives the playback signal $S_P$ from the magnetic tape, and the playback amplifier 12 amplifies the playback signal $S_P$.

Figure 3:
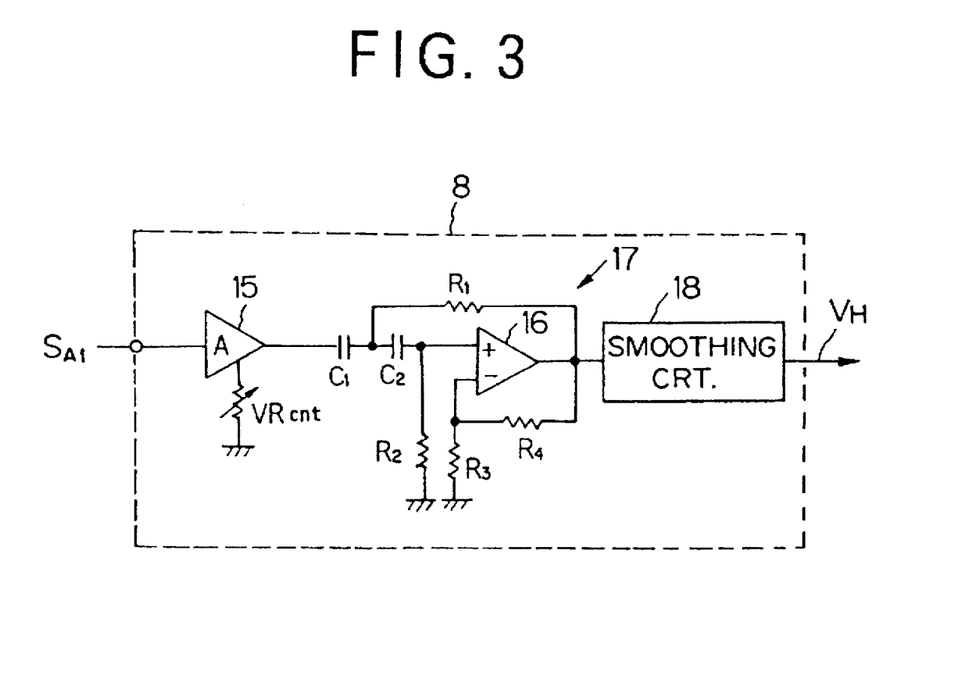
FIG. 3 is a block diagram illustrating the circuit configuration of the variation amount determination circuit.
Figure 7:
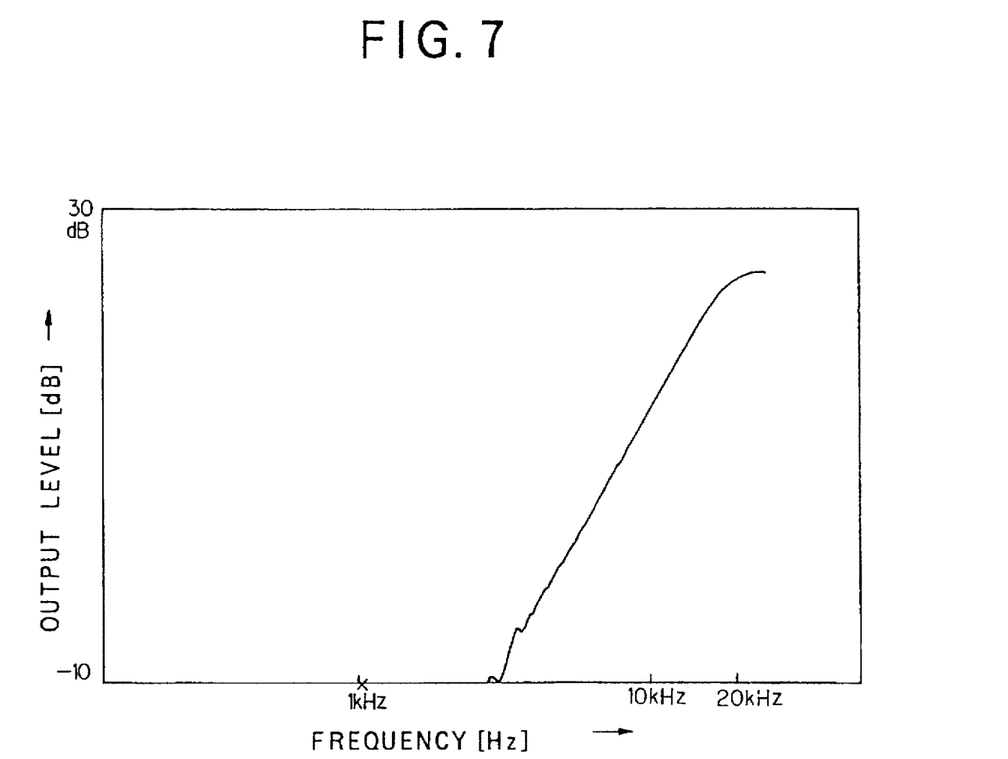
FIG. 7 is a diagram illustrating the frequency characteristic of the variation amount determination circuit.
Figure 8A:
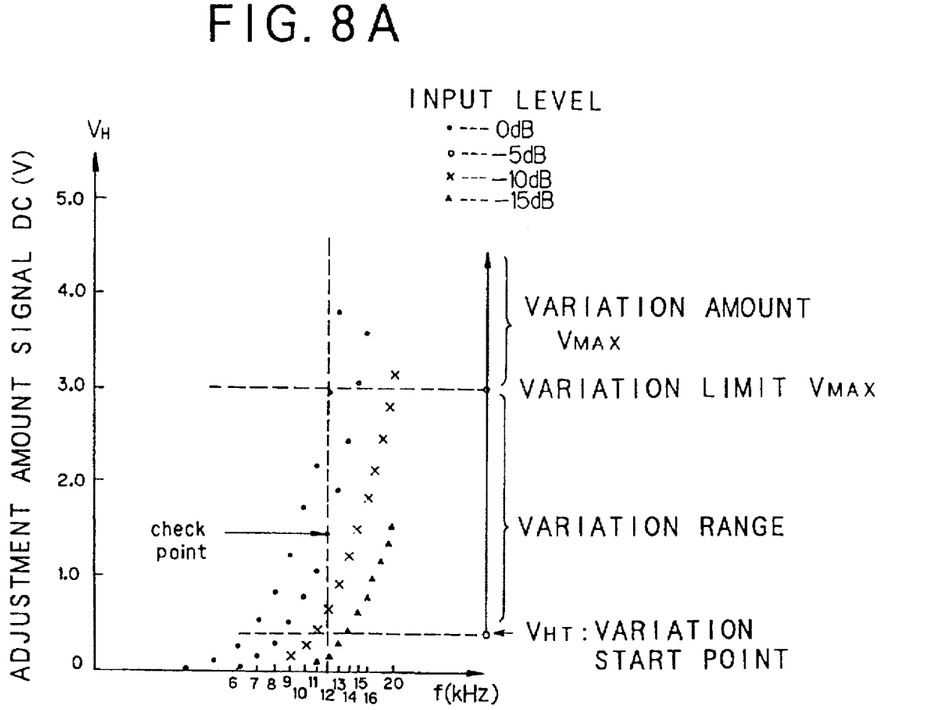
FIG. 8A is a diagram illustrating the range of the bias variation.

(2) Variation amount determination circuit:

FIG. 3 illustrates the circuit configuration of the variation amount determination circuit 8. As shown in FIG. 3, the variation amount determination circuit 8 includes the amplifier 15 having the variable resistor $VR_{cnt}$ for varying the magnitude of the audio signal $S_{A1}$, the operational amplifier 16, the high pass filter (HPF) 17 including the resistors $R_1$ to $R_4$ and the condensers $C_1$ and $C_2$, and the smoothing circuit 18 for smoothing the high frequency signal to produce and output the D.C. adjustment amount signal $V_H$. The cut-off frequency of the HPF 17 depends upon the time constant determined by the constants of the resistors $R_1$ and $R_2$ and the condensers $C_1$ and $C_2$, and the attenuation ratio and the Q-factor (sharpness) thereof are determined on the basis of the ratio of the resistors $R_3$ and $R_4$. For example, the constants of the resistors and the condensers are determined so that the cut-off frequency $f_c$ (=$1/(2\pi CR)$) under the condition that :$R_1=R_2=R$, $C_1=C_2=C$, approximately equals 20 [kHz]. The attenuation characteristic of the HPF 17 is determined in such a way that the signal $V_H$ of the same value can be produced in both cases where the audio signal $S_{A1}$ of 15 [kHz]/–1 [dB] is supplied and where the audio signal $S_{A1}$ of 12 [kHz]/–6.5 [dB] is supplied. The attenuation characteristic is determined by the ratio of the resistor $R_3$ to the resistor $R_4$. In addition, the variable resistor $VR_{cnt}$ is adjusted so that the adjustment amount signal $V_H$ becomes the appropriate level for the microcomputer 1 to receive. The HPF 17 used for producing the adjustment amount signal $V_H$ may be replaced by a band pass filter. In that case, the attenuation characteristic of the band pass filter at the lower frequency side may be utilized. FIGS. 7 and 8A illustrate the output characteristic of the variation amount determination circuit 8 obtained by the above described adjustments. As seen from FIG. 8A, the magnitude level of the output signal varies logarithmically with the frequency.

Figure 4:
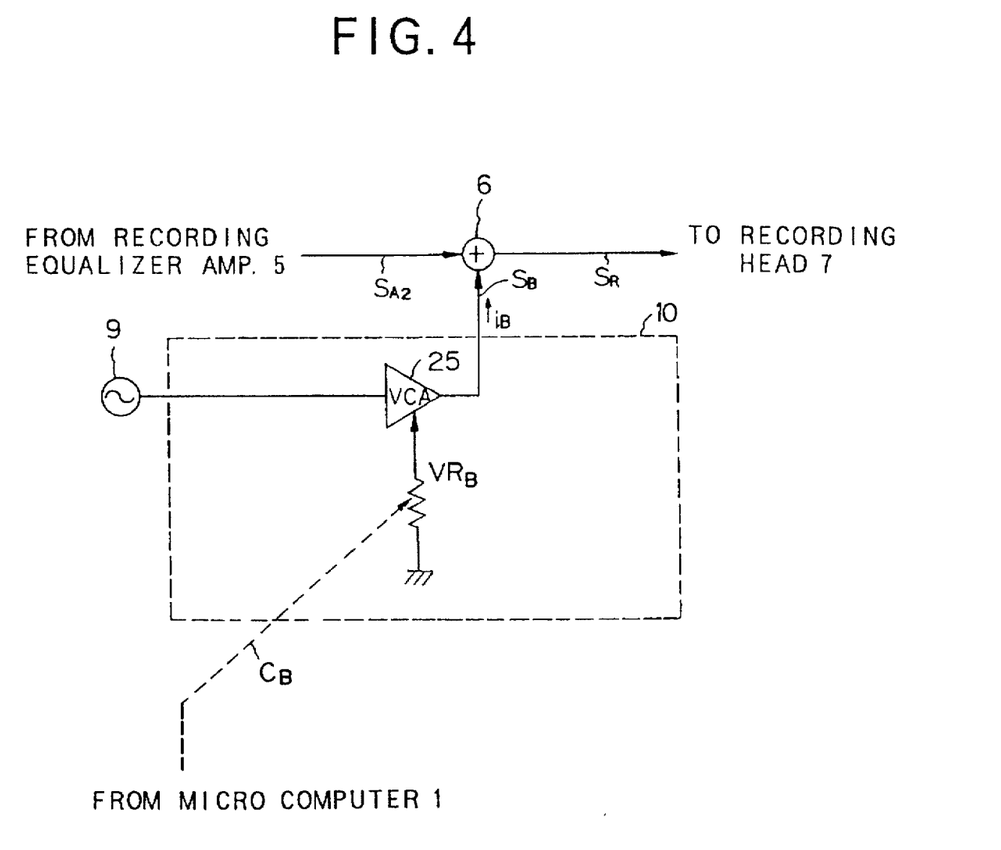
FIG. 4 is a block diagram illustrating the configuration of the variable bias circuit.
Figure 8B:
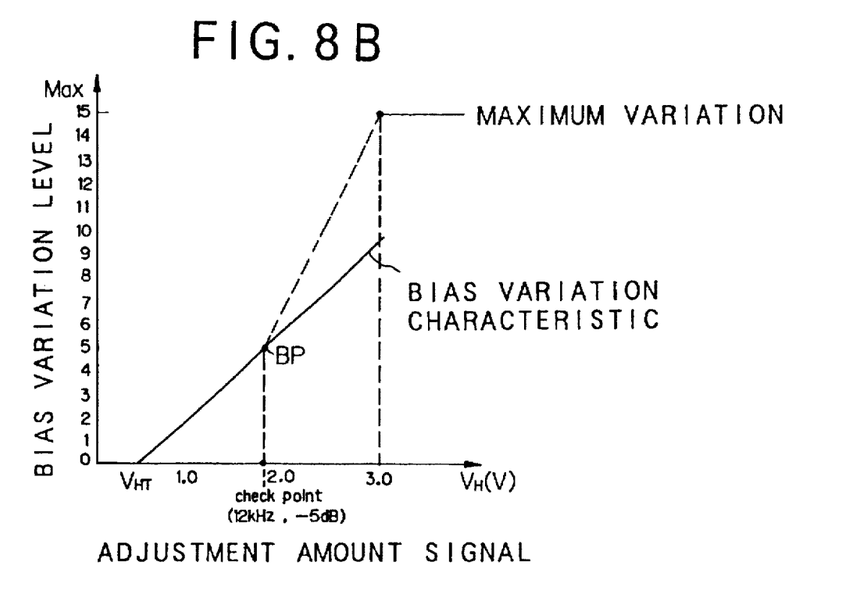
FIG. 8B is a diagram illustrating the bias variation characteristic.

(3) Variable bias circuit:

FIG. 4 illustrates the configuration of the variable bias circuit 10. As seen from FIG. 4, the variable bias circuit 10 includes the variable resistor $VR_B$ and the VCA circuit 25. The variable resistor $VR_B$ is adjusted by the control signal $C_B$ supplied from the microcomputer 1. The VCA circuit 25 conducts current amplification onto the bias signal supplied from the bias signal generator 9 so as to be the level corresponding to the level specified by the variable resistor $VR_B$, and outputs the bias signal $S_B$ to the adder 6. The microcomputer 1 makes the control signal $C_B$ to correspond to the variation step "0" described later (see. FIG. 8B) when the bias current variation is not required, that is, when the VCA circuit 25 outputs the reference bias current. When the control signal $C_B$ varies according to the change of the variation step, the VCA circuit 25 decreases the bias current $i_B$ in proportion with the change of the variation step. It is noted that the variable bias circuit may be configured as the conventional type automatic bias control device which absorbs the high frequency component of the audio signal acting as the effective bias.

[3] Operation

Figure 9:
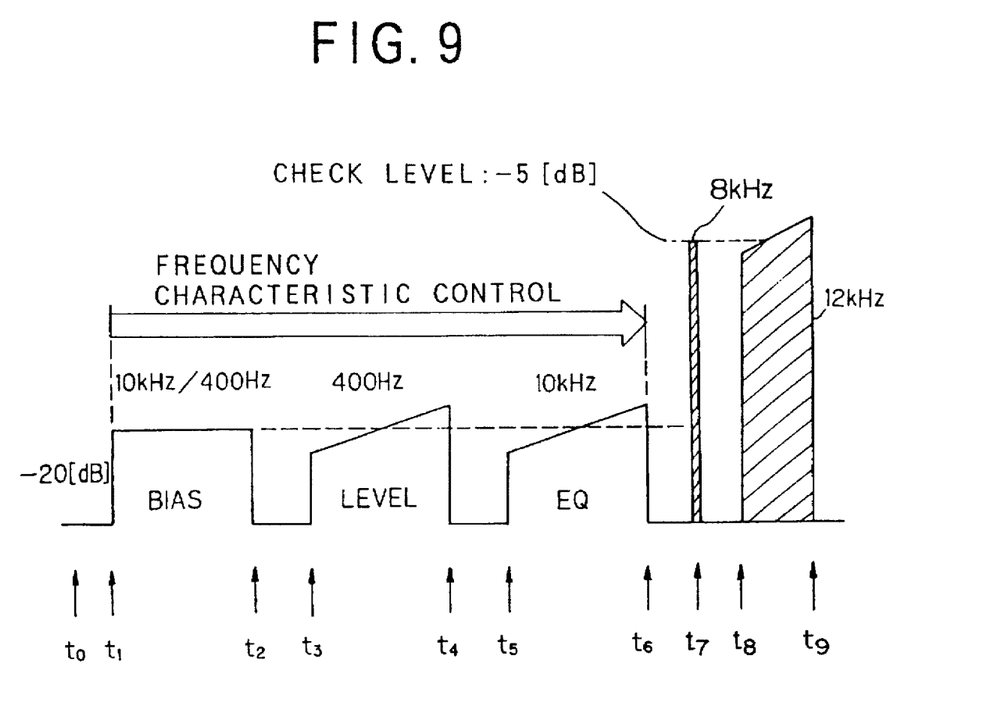
FIG. 9 is a timing chart illustrating the automatic bias control.

Next, the operation of the embodiment will be described with reference to FIG. 9.

(1) Frequency characteristic control step:

First, the microcomputer 1 starts the automatic bias control under the condition where the magnetic tape is set. At the time $t_0$, the microcomputer 1 changes over the switch SW, and allows the test signal generator 3 to generate the test signal $S_T$ in which the signals of 400 [Hz] and 10 [kHz] alternatively appear. The test signal $S_T$ is recorded on the magnetic tape by means of the recording head 7 after passing the noise reduction IC 4 and the recording equalizing amplifier 5. At this time, the variable resistors $VR_L$ and $VR_E$ have been set approximately to the initial values, respectively. The test signal $S_T$ thus recorded is reproduced immediately by the playback head 11, and supplied to the noise reduction IC 4 via the playback amplifier 12. The noise reduction IC 4 performs the equalization, at the time of reproduction, according to the characteristic reverse to that at the time of recording, and therefore the influence to the frequency characteristic given by the noise reduction IC 4 may be absorbed. The playback signal $S_{P1}$ is digitized by the level detection circuit 14, and is supplied to the microcomputer 1.

From the time $t_1$ to time $t_2$, the microcomputer 1 changes the bias current of the bias circuit 10 using the control signal $C_B$, and monitors the playback signal level. Then, the microcomputer 1 stores the playback signal levels for each frequency of the test signal $S_T$ in the RAM of the microcomputer 1. The microcomputer 1 calculates the difference of the recording signal level for each of the set signal frequencies during the change of the bias current amount by the bias circuit 10. Then, the microcomputer 1 decides the bias current amount, as the reference bias amount, under the condition where the playback signal levels which make the smallest differences of the recording/playback levels for the two frequencies are obtained. From the time $t_3$ to the time $t_4$, the variable resistor $VR_L$ is varied by the control signal $C_L$ while the same test signal $S_T$ is being recorded. In response, the level of the test signal $S_T$ being recorded varies. The microcomputer 1 stores the value of the control signal $C_L$ where the playback signal level becomes equal to a predetermined level, e.g., –20 [dB], and sets it as the reference level. From the time $t_5$ to the time $t_6$, the test signal $S_T$ is changed to a high frequency signal, e.g., 10 [kHz]/−20 [dB] while the reference bias current and the reference level are maintained to be the same values, respectively. Then, the microcomputer 1 monitors the playback signal level while controlling the equalization characteristic of the equalization amplifier 5 using the control signal $C_E$, and determines, as the reference equalization characteristic, the equalization characteristic where the playback signal level becomes equal to that at the case of applying the test signal of 400 [kHz] (e.g., −20 [dB]). In this way, the reference bias current, the reference level and the reference equalization characteristic can be determined so that low level audio signals can be recorded and reproduced under flat frequency characteristic.

(2) Bias current variation characteristic determination step:

Next, the bias current variation characteristic determination step which begins at the time $t_7$ will be described. First, the microcomputer 1 refers to the tape type signal $T_y$, and selects the variation start point $V_{HT}$. Namely, the microcomputer 1 has stored the optimum variation start points for each of the tape types, e.g, $V_{HT}$=0.4 [V] for normal type tape and $V_{HT}$=0.6 [V] for chrome type tape. It is noted that the microcomputer 1 has stored plural (e.g. 2 points) variation start points for each tape types. This is because, since the variation start points for the magnetic tapes of identical tape type may slightly differ from each other when it is precisely measured, an appropriate one of them should be selected. The variation start point functions as the reference point of the bias current variation operation, and therefore a slight difference of the variation start points results in a large difference of the variation characteristic. In addition, the microcomputer 1 sets the bias variation limit for each tape types. The bias variation limit is determined to restrict the range of the bias variation (i.e., from the variation start point to the bias variation limit). The bias variation limit is introduced for the following reason. When the adjustment amount signal $V_H$ is smaller than the bias variation start point, i.e., the variation of the playback signal level is small, the effect of the bias current variation is small. In addition, when the adjustment amount signal $V_H$ is larger than the bias variation limit, i.e., the level of the recording audio signal is large to some degree, the playback signal level does not vary any more due the saturation of the magnetic characteristic of the magnetic tape. These are why the variation limit is provided. In addition, the reason why the variation limits are prepared for each tape types is that the saturation points of the magnetic characteristics differ from each other between the different tape types. In FIG. 8A, the bias variation range is determined between as the adjustment amount signals $V_H$=0.4 and 3.0 [V]. If the adjustment amount signal $V_H$ is higher than the variation limit, the adjustment amount signal $V_H$ is fixed to the upper limit amount $V_{MAX}$.

At the time $t_7$, the microcomputer 1 controls the test signal generator 3 to output the test signal $S_T$ of a constant frequency and a constant magnitude level (e.g., 8 [kHz]/−5 [dB]). The test signal $S_T$ is at the border where the bias current variation is needed for the magnetic tapes of many types. Therefore, the microcomputer 1 records the test signal $S_T$ on the magnetic tape, checks the attenuation amount of the reproduced test signal and selects one of the two optimum bias variation start points stored in the microcomputer 1 in advance. For example, the microcomputer 1 selects the smaller one to increase the bias variation amount when the attenuation of the reproduced test signal is large. In contrast, the microcomputer 1 selects larger one when the attenuation amount is quite small. After the variation start point is determined, the bias variation characteristic is determined.

FIG. 8B illustrates the bias variation step for obtaining the bias variation characteristic. As shown in FIG. 8B, the microcomputer 1 divides the bias variation range, i.e., the variation start point to the maximum variation amount, into a plurality of variation levels. For example, the microcomputer 1 decides the variation start point $V_{HT}$ to the variation level "0", the maximum bias variation amount to the variation level "15", and allocates the plural bias variation levels with equal intervals between them. When the variation level is large, the variation amount is large and the bias current is decreased largely to a great extent. Namely, the microcomputer 1 changes the recording sensitivity at the high frequency range by varying the variation level. According to the variation levels thus determined, the bias variation is not performed when the variation level is "0", and the maximum bias current variation is performed when the variation level is "15". The bias current amount corresponding to the maximum amount of bias variation is determined to be 25% smaller than the bias amount initially set, for example. This amount is not limited to this example and may be decided in consideration of the range where the plotted point BP locates as described later.

From the time $t_8$ to the time $t_9$, the microcomputer 1 controls the test signal generator 3 to output the test signal $S_T$ having a certain level (e.g., 12 [kHz]/−5 [dB]) under which the playback signal level is attenuated in comparison with the recording signal at the predetermined high frequency range. Then, the microcomputer 1 varies the control signal $C_B$ by incrementing the variation level one by one to record the test signal $S_T$ for a predetermined time period. When the test signal is thus recorded, it is then reproduced by the playback head 11. The microcomputer 1 monitors the playback signal level obtained by the playback signal $S_{P1}$, and detects the bias variation amount at which the playback signal level reaches the check level. When the playback signal level reaches the check level, the playback signal level becomes under a certain relationship with the recording signal level (e.g., they are equal to each other, i.e., both the recording signal level and the playback signal level become −5 [dB]). The microcomputer 1 monitors the playback signal level which gradually increases according to the decrease of the bias current, and detects whether the playback signal level becomes equal to the predetermined check level. When the playback signal level becomes equal to the check level, the microcomputer 1 decides, as the point BP, the adjustment amount signal $V_H$ at that time and the variation level prescribing the bias variation amount. FIG. 8B represents the example of the check point BP where the adjustment amount signal $V_H$ is 1.8 [V] and the variation level is "5". The line connecting the check point BP and the predetermined variation start point $V_{HT}$ indicates the bias variation characteristic for obtaining the flat frequency characteristic even in the high frequency range. In normal recording, the microcomputer 1 increases and/or decreases the variation level in accordance with the variation characteristic obtained based on the inputted adjustment amount signal $V_H$, thereby producing the flat frequency characteristic of playback. The bias variation characteristic may be decided by the check point BP and the variation start point $V_{HT}$ as described above, but may alternately be decided as a line prescribed by the maximum variation level and the point BP as shown in the broken line in FIG. 8B. By this, the frequency characteristic is controlled to increase the bias current at the high frequency range where the variation amount is larger than the test signal $S_T$, thereby improving the auditory balance of the playback signal.

When the bias variation characteristic determination step ends in this way, the microcomputer 1 changes over the switch SW to the side of the terminal 2, and starts recording the audio signal according to the bias variation characteristic thus determined. When the audio signal is inputted to the variation amount generation circuit 8 and the audio signal includes the high frequency component, the adjustment amount signal $V_H$ is supplied to the microcomputer 1. The microcomputer 1 varies the bias current amount in accordance with the bias variation characteristic and the adjustment amount signal $V_H$ obtained in the variation amount determination step. By this, the drop of the recording sensitivity at this high frequency range may be compensated for, and the audio signal may be recorded and reproduced according to the flat frequency characteristic even at the high frequency range.

Figure 10:
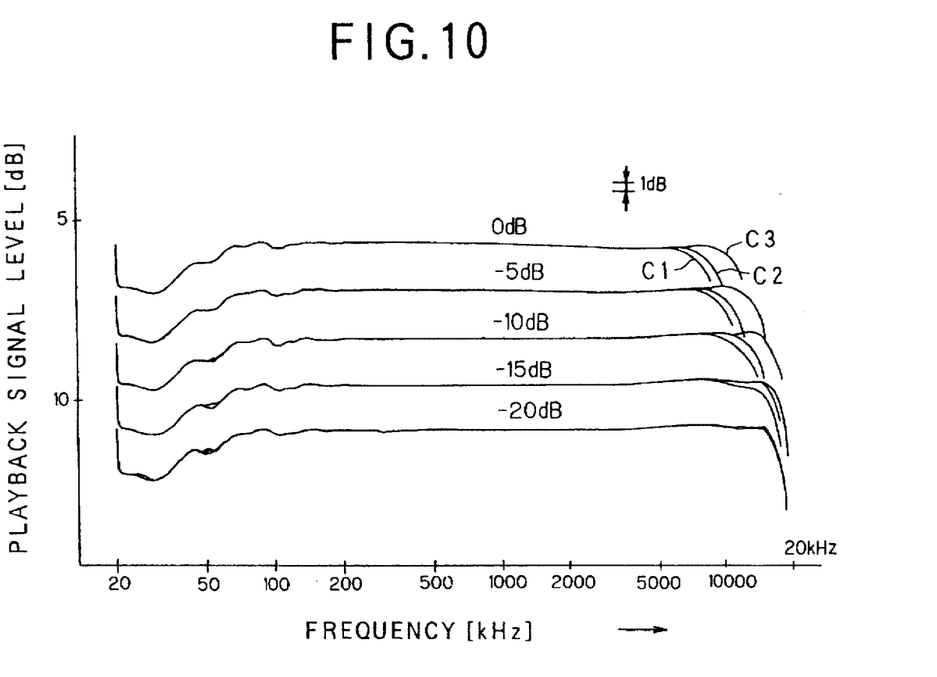
FIG. 10 is a diagram illustrating the frequency characteristic of the audio signal for different input levels.
Figure 11A:
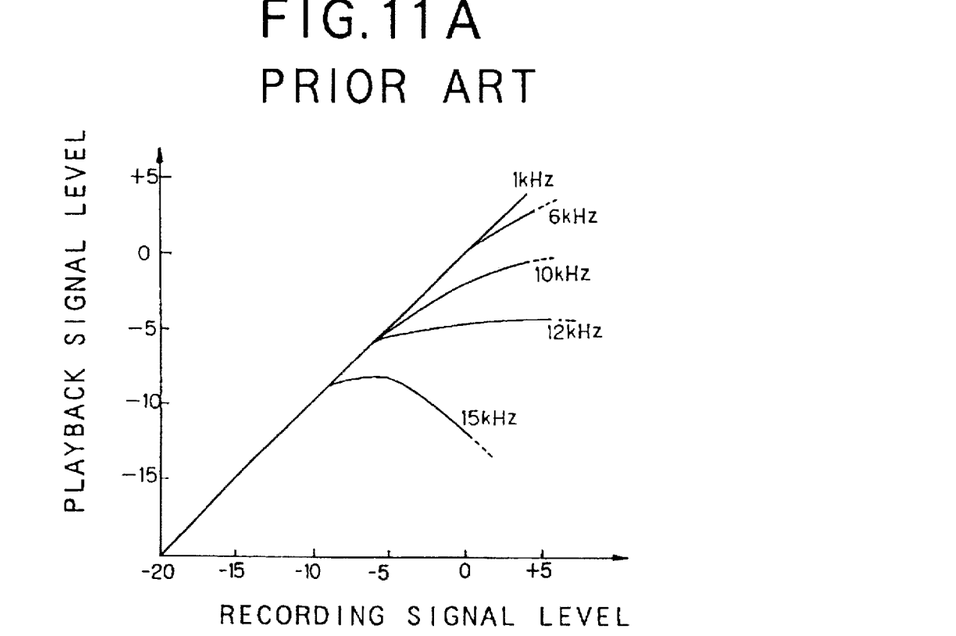
FIG. 11A is a diagram illustrating the input/output characteristic obtained by the conventional automatic bias control circuit.
Figure 11B:
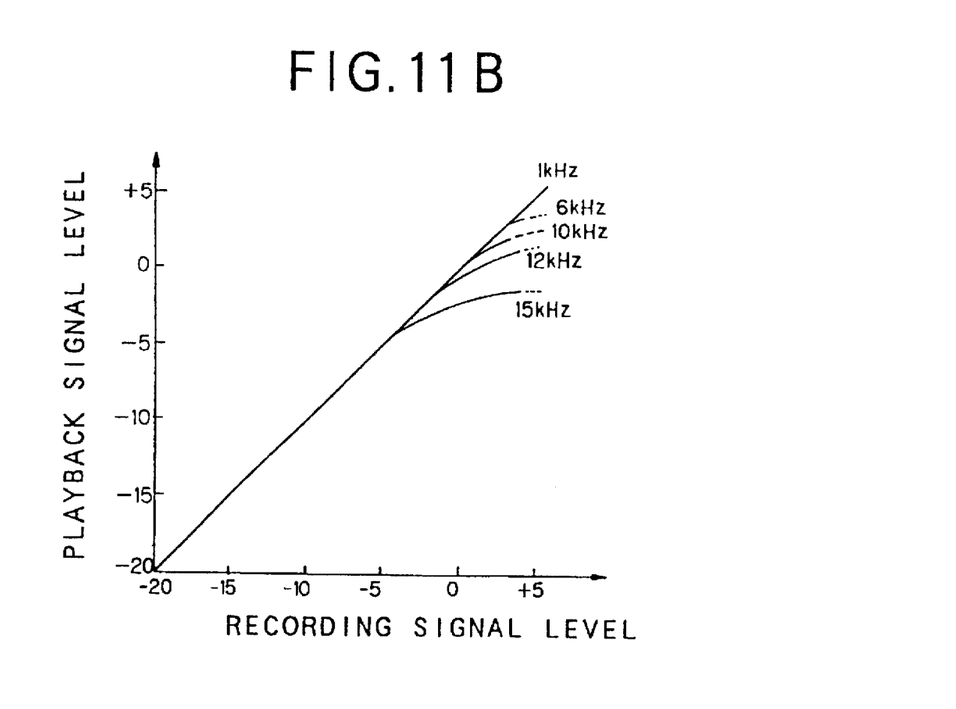
FIG. 11B is a diagram illustrating the input/output characteristic obtained by the automatic bias control circuit of this invention.

FIGS. 10, 11A and 11B illustrate the characteristics obtained by the automatic bias control device of this invention. FIG. 10 illustrates the frequency characteristic of the audio signal for each of the input levels (characteristics of the playback signal $S_{P1}$). In FIG. 10, the reference C1 represents the frequency characteristic where the automatic bias control is not performed, the reference C2 represents the frequency characteristic improved by the conventional automatic bias control circuit, and the reference C3 represents the frequency characteristic improved by the automatic bias control circuit according to this invention. As seen from FIG. 10, the frequency characteristic is remarkably improved at the high frequency range especially for the input signal of large magnitude level. FIGS. 11A and 11B show the input/output characteristics using the normal type compact cassette tape. FIG. 11A represents the characteristic obtained by the conventional automatic bias control circuit, and FIG. 11B represents the characteristic obtained by the automatic bias control circuit of this invention. As shown in FIGS. 11A and 11B, the high frequency range of the input/output characteristics sufficiently approach the ideal characteristic.

As described above, according to the present invention, the automatic bias control device automatically controls the bias current by referring to the recording ability of the magnetic tape used for the recording and by the functions of the variation amount determination circuit including the HPF and the microcomputer. Therefore, the frequency characteristic at the high frequency range may be remarkably improved.

In the above described automatic bias control device, the bias variation characteristic is obtained by applying the test signal onto the magnetic tape in the adjusting step. However, under the condition that the recording media have identical characteristics, the bias variation characteristic may be fixed. Namely, if the characteristics of the recording media are identical to each other, the characteristic variation point and the variation start point are identical, and the inclination of the bias current variation characteristic is constant. Therefore, the automatic bias control device is not required to produce the bias variation characteristic by applying the test signal, and can perform normal recording and reproduction of the audio signal based on the fixed characteristic.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A method of controlling a bias current required to record an audio signal on a recording medium, said method comprising the steps of:
    (a) recording a test signal, other than the audio signal to be recorded, the test signal having a frequency component higher than a predetermined frequency on said recording medium and reproducing the recorded test signal from said recording medium;
    (b) determining a reference amount of the bias current variation on the basis of the level of the reproduced test signal;
    (c) determining a bias current variation characteristic of said recording medium on the basis of the reference amount; and
    (d) repeatedly varying the bias current in accordance with a level change of a high frequency component of the audio signal by referring to the bias current variation characteristic during a recording of the audio signal.

2. A method according to claim 1, further comprising the step of: (e) controlling the bias current, a recording level and an equalization characteristic so that frequency characteristic of the reproduced audio signal obtained by recording and reproducing the audio signal becomes flat when the level of the reproduced audio signal is less than a predetermined magnitude level.

3. A method according to claim 1, wherein said reference amount determining step (b) determines the reference amount on the basis of a type of said recording medium.

4. A method according to claim 1, wherein said bias current variation characteristic determining step (c) comprises the steps of: (f) determining a bias current variation range based on the reference amount and a predetermined maximum variation amount; and (g) determining a plurality of variation levels each corresponding to a bias current amount in the bias current variation range.

5. A method according to claim 1, wherein said bias current varying step (d) gradually decreases the bias current, as the level of the high frequency component of the audio signal increases.

6. An automatic bias control device comprising:
    means for generating a bias current;
    means for generating a test signal, said test signal being different than an audio signal which is ultimately to be recorded, the test signal having a predetermined level and a frequency component higher than a predetermined frequency;
    means for recording the test signal on a recording medium and reproducing the recorded test signal from said recording medium;
    means for determining a bias current variation characteristic of said recording medium on the basis of the reproduced test signal;
    means for varying the bias current in accordance with a level change of a high frequency component of an audio signal by referring to the bias current variation characteristic; and
    means for recording the audio signal on the recording medium using the bias current varied, during the recording of the audio signal, by said bias current varying means.

7. A device according to claim 6, wherein said bias current variation characteristic determining means comprises means for determining a reference amount of the bias current variation on the basis of the level of the reproduced test signal; and means for determining a bias current variation characteristic of said recording medium on the basis of the reference amount.

8. A device according to claim 7, wherein said reference amount determining means determines the reference amount so that a level of the reproduced test signal substantially equals to a level of the test signal recorded and reproduced under a flat frequency characteristic.

9. A device according to claim 6, wherein said test signal recording means records the test signal with varying the bias current.

10. A device according to claim 6, wherein said bias current varying means gradually decreases the bias current, as the level of the high frequency component of the audio signal increases.

* * * * *